US010442964B2

(12) United States Patent
Grun et al.

(10) Patent No.: US 10,442,964 B2
(45) Date of Patent: Oct. 15, 2019

(54) BIOGENIC LIQUID NON-REACTIVE DILUENTS IN SYNTHETIC RESIN ADHESIVE COMPOSITIONS

(71) Applicant: fischerwerke GmbH & Co. KG, Waldachtal (DE)

(72) Inventors: Jurgen Grun, Botzingen (DE); Martin Vogel, Glottertal (DE); Christian Schlenk, Denzlingen (DE); Christian Weinelt, Emmendingen (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 660 days.

(21) Appl. No.: 14/779,819

(22) PCT Filed: Mar. 21, 2014

(86) PCT No.: PCT/EP2014/000773
§ 371 (c)(1),
(2) Date: Sep. 24, 2015

(87) PCT Pub. No.: WO2014/161638
PCT Pub. Date: Oct. 9, 2014

(65) Prior Publication Data
US 2016/0053142 A1 Feb. 25, 2016

(30) Foreign Application Priority Data
Apr. 5, 2013 (DE) .................. 10 2013 103 396

(51) Int. Cl.
*C09J 135/02* (2006.01)
*C09J 4/00* (2006.01)
*C08F 220/28* (2006.01)
*C08F 222/10* (2006.01)
*C09J 163/00* (2006.01)
*C08K 5/00* (2006.01)
*C08K 5/11* (2006.01)
*C08K 3/01* (2018.01)

(52) U.S. Cl.
CPC .............. *C09J 135/02* (2013.01); *C09J 4/00* (2013.01); *C08F 2220/281* (2013.01); *C08F 2222/1093* (2013.01); *C08K 3/01* (2018.01); *C08K 5/0008* (2013.01); *C08K 5/11* (2013.01); *C09J 163/00* (2013.01)

(58) Field of Classification Search
CPC .......... C09J 135/02; C09J 4/00; C09J 163/00; C08K 5/11; C08K 3/01; C08K 5/0008; C08F 2222/1093; C08F 2220/281
USPC ........................................................ 524/310
See application file for complete search history.

(56) References Cited

U.S. PATENT DOCUMENTS

| 6,077,886 | A | 6/2000 | Hayes et al. |
| 7,498,389 | B2 | 3/2009 | Vogel et al. |
| 8,022,164 | B1 | 9/2011 | Wu et al. |
| 8,304,474 | B2 | 11/2012 | Wieland |
| 2012/0184681 | A1* | 7/2012 | Hibben ................ C08F 230/08 525/274 |
| 2013/0237634 | A1 | 9/2013 | Buergel |

FOREIGN PATENT DOCUMENTS

| CA | 2143426 A1 | 3/1994 |
| CN | 103 013 411 A | 4/2013 |
| DE | 38 02 916 A1 | 9/1988 |
| DE | 198 12 247 A1 | 9/1999 |
| DE | 10 2010 008 971 A | 8/2011 |
| EP | 0 650 942 A1 | 5/1995 |
| JP | S60-258205 A | 12/1985 |
| JP | 2002-309184 A | 10/2002 |
| JP | 2003-041227 A | 2/2003 |
| JP | 2008-001818 A | 1/2008 |
| JP | 2009-167365 A | 7/2009 |
| KR | 100 822 290 B1 | 4/2008 |
| WO | WO 94/04588 A1 | 3/1994 |
| WO | WO 2005/090433 A1 | 9/2005 |
| WO | WO 2009/048598 A1 | 4/2009 |
| WO | WO 2011/019997 A1 | 2/2011 |
| WO | 2012/024301 A1 | 2/2012 |
| WO | WO 2012/065878 A1 | 5/2012 |

OTHER PUBLICATIONS

English translation of the Written Opinion for corresponding International Application No. PCT/EP2014/000773 dated Jul. 7, 2014.
Office Action issued in corresponding Japanese Application No. 2016-505728 dated Sep. 10, 2018.
Co-pending U.S. Appl. No. 14/779,832, filed Sep. 24, 2015.
Co-pending U.S. Appl. No. 14/779,855, filed Sep. 24, 2015.
International Search Report and Written Opinion for corresponding International Application No. PCT/EP2014/000773 dated Jul. 7, 2014.
ATSM 6866 by TÜV Rheinland (Din Certco, Berlin, Germany); ATSM 6866 (Standard Test Method for Determining the Biobased Content Solid, Liquid and Gaseous Samples Using Radiocarbon Analysis (ASTM International, D6866:2008, Method A) (cited on page 3 of the specification).
Lee et al., "Handbook of Epoxy Resins", (New York: McGraw-Hill), 1982, Chapters 7-10 (cited on page 8 of the specification).

* cited by examiner

Primary Examiner — Angela C Scott
(74) Attorney, Agent, or Firm — Renner, Otto, Boisselle & Sklar, LLP

(57) ABSTRACT

Multi-component synthetic resin adhesive composition for the fixing sector, especially for adhesively bonding an anchoring element in a hole (for example, a drilled hole) or crevice, comprising fillers, which comprises a biogenic liquid diluting agent (for example a vegetable oil, such as especially castor oil, or a polyol); use of the synthetic resin adhesive composition for embedding anchoring means in mortar in holes or crevices; process or method for embedding anchoring elements in mortar and holes or crevices, in which the synthetic resin adhesive composition is used; and use of biogenic fillers in producing such a synthetic resin adhesive composition.

20 Claims, No Drawings

BIOGENIC LIQUID NON-REACTIVE DILUENTS IN SYNTHETIC RESIN ADHESIVE COMPOSITIONS

TECHNICAL FIELD OF THE INVENTION

The invention relates to multi-component synthetic resin adhesive compositions for the fixing sector, especially for adhesively bonding an anchoring element in a hole (for example, a drilled hole) or crevice, comprising non-reactive diluents (diluting agents) and optionally further additives, and to further subject-matter of the invention mentioned hereinbelow.

DISCUSSION OF RELATED ART

A multiplicity of (for example, injectable) fixing mortar systems (synthetic resin adhesive compositions) based on an extremely wide variety of polymer-forming components is known, sometimes in the form of single-component systems and sometimes in the form of two-component or multi-component systems, which are used for embedding anchoring means, such as bolts, anchor rods or the like, in mortar in holes, such as drilled holes, or crevices, in each case in solid substrates such as, for example, masonry or concrete. Further components, for example facing elements, can then be fixed to the anchoring means. The embedding of the anchoring means in mortar is based, on the one hand, on adhesive effects in the sense of a material-bonded connection between the synthetic resin and an anchoring element and/or the wetted surface of the hole or crevice and/or, on the other hand, on an interlocking connection, such as, for example, undercuts formed by using the synthetic mortar to surround projecting or recessed portions of the anchoring element and/or of a hole or crevice.

WO 2011/019997 A1 and WO 94/04588 A1 mention castor oil and glycerol as polyols which are reacted with isocyanates to form urethanes, that is to say they are not unreactive; the second application also mentions glycerol as a covalently bonded moiety of a polyether polyol.

WO 2012/065878 A1 mentions castor oil derivatives (the customary ones are not liquid) as thickeners. DE 10 2010 008 971 A1 mentions free-radical-polymerisable resins comprising castor oil derivatives (the customary ones are not liquid) as thickeners. In this case the castor oil derivatives are present chiefly as thixotropic auxiliaries. All these castor oil derivatives are used as rheology additives in the range up to a maximum of 5%. They are solids which, for the production of the composition, are subjected to controlled melting, are finely dispersed in the molten state and then crystallised again with structure in the composition and thereby become rheologically active.

Castor oil ethoxylates are often also used as surfactants and emulsifiers especially in mineral systems. DE 198 12 247 A1 mentions castor oil ethoxylate as emulsifier in cement.

WO 2012/065878 mentions free-radical-hardenable resins, wherein glycerol is possible as an organic solvent for the hardener component. WO 2009/048598 mentions protein-based wood adhesives with "non-urea" diluents, inter alia glycerol. EP 0 650 942 A1 mentions hydraulic mortars having a free-radical-hardenable resin additive and inter alia glycerol as evaporation retarder or thixotropic auxiliary in the hardener component.

The prior art accordingly relates to problems and solutions that differ from the present invention.

In the synthetic resins and plastics sector there is, for ecological and economic reasons and as a result of legislation making it favourable, a requirement to reduce the organically bound carbon content of fossil constituents (obtained, for example, from petroleum, lignite coal or bituminous coal).

Biomass and/or biosphere-based (renewable, sustainable, bio-based) or, in short, "biogenic" raw materials for carbon are sparing of resources and, because of their long-term obtainability, are of special interest.

In order to assess the proportion of bio-based raw materials it is customary to ascertain the proportion of bio-based carbon, which is detected by means of the $^{14}C$ method. Because the ratio of carbon isotopes can still be determined after the production process, it is possible to distinguish between fossil and biogenic biomass.

Bio-based products can consist entirely or at least partly of bio-based raw materials. It is also possible for further additional substances, inorganic substances or fossil materials, or two or more thereof, to be included.

Efforts are being made to make standardised certifications for products with bio-based contents possible. An example is the certification program for bio-based products according to ASTM 6866 by TÜV Rheinland (DIN CERTCO, Berlin, Germany) in order to gain the right to mark a product with the certification "Bio-based . . . %, DIN-tested", for example "Bio-based 50 to 85%, DIN-tested".

In order to gain such certification, a double minimum requirement is imposed: firstly, the minimum content of organic material, determinable as loss on ignition, must be at least 50% by weight.

Secondly, the content of bio-based carbon must exceed 20% by weight (for a certification of "Bio-based 20 to 50%, DIN-tested", it must be between 20 and 50% by weight; for a certification of "Bio-based 50 to 85%, DIN-tested", it must be between 50 and 85% by weight; for a certification of "Bio-based>85%, DIN-tested", it must be at least 85% by weight).

Testing of a product is carried out by taking samples from production or from marketing/selling channels (usually by the manufacturer or the seller themselves) and testing them. An initial test is carried out, and regular monitoring.

In this, the loss on ignition can be determined by customary methods. It corresponds to the amount of organic material. A known mass $m_0$ of test material is ashed, and the mass of the solid residue obtained $m_r$ is determined and subtracted from $m_0$. This corresponds to the volatile and/or organic content of the test material. A high loss on ignition indicates a high organic substance content in the sample, because the carbon contained therein is oxidised and is given off in the form of carbon dioxide. The determination can be carried out, for example, in accordance with DIN EN 14775 or DIN 18128.

The bio-based carbon content is carried out on the basis of ASTM 6866 (Standard Test Method for Determining the Biobased Content of Solid, Liquid and Gaseous Samples Using Radiocarbon Analysis (ASTM International, D6866: 2008, Method A).

SUMMARY OF THE INVENTION

A problem of the invention was to increase the proportion of biogenic materials in synthetic resin adhesive compositions and (especially in special embodiments of the invention) also to realise further advantages.

It has now been found that non-reactive, biogenic diluting agents that are liquid in use (for example at room temperature) can be added to a synthetic resin adhesive composition mentioned at the outset without the properties thereof being impaired, it even being possible to realise advantages such as good thickenability, low separation tendency, good mortar expressibility from the cartridge and good compatibility with the reactive components (high storage stability).

The invention therefore relates to the multi-component (especially cold-hardening (that is to say curing in the range between −40° C. and 50° C., especially between −5° C. and 40° C.)) synthetic resin adhesive compositions mentioned at the outset, characterised in that it comprises at least one biogenic, non-reactive diluent that is liquid at application temperature.

Since the diluting agents (materials) are biogenic (and do not contain fossil carbon), such diluents, or mixtures of two or more thereof, make it possible for the proportion of biogenic materials in the mentioned multi-component synthetic resin adhesive compositions to be increased while the performance thereof is nevertheless more than sufficient.

As an unexpected advantage, when used in the hardener component, a good stabilising action for the initiator, for example peroxide hardener, can be observed, so that it is possible to produce very storage-stable pastes. A suitable test system, which can be applied generally, can be found in the Examples.

As a further unexpected advantage, it can be found that synthetic resin adhesive compositions have only poor miscibility or are immiscible with otherwise customary water-based hardeners. If the hardeners are formulated with the proposed biogenic raw materials, however, they can be incorporated more homogeneously and more satisfactorily into the synthetic resin ((A)) component, which can also be seen from a shorter gel time. In this case too, a suitable test system, which can be applied generally, can be found in the Examples.

The invention therefore relates, in a first embodiment, to a multi-component synthetic resin adhesive composition as mentioned at the outset, characterised in that it comprises an (at least partly) biogenic, liquid (as such (especially in isolated form) at application temperature), non-reactive diluting agent (diluent) (especially as mentioned hereinbefore and hereinbelow), or in each case mixtures of two or more thereof.

Corresponding processes and methods for embedding anchoring elements in mortar and holes or crevices, wherein a multi-component synthetic resin adhesive composition according to the invention is used for the embedding of anchoring means in mortar, wherein the synthetic resin adhesive composition and an anchoring means are successively, especially first the synthetic resin adhesive composition and then the anchoring means, or (at least substantially) simultaneously introduced into a hole or crevice in a substrate (also in a cracked substrate, such as in cracked concrete), also form an embodiment of the invention.

The invention also relates, in a further embodiment, to use of one of the mentioned biogenic, liquid (as such (especially in isolated form) at application temperature), non-reactive diluting agents (diluents), (especially as mentioned hereinbefore and hereinbelow), or in each case mixtures of two or more thereof, as non-reactive diluents for multi-component synthetic resin adhesive compositions for the purposes according to the invention, wherein at least one of the biogenic, liquid, non-reactive diluting agents is added to a composition of such a kind.

The definitions hereinbelow serve to clarify certain terms or symbols and to describe special embodiments of the invention; in the embodiments of the invention mentioned hereinabove and hereinbelow it is possible for individual, some or all terms or symbols to be replaced by more specific definitions, resulting in special embodiments of the invention.

Biogenic means preferably that the materials (or other biogenic components) are obtained from plants or vegetable materials or furthermore also from animal sources. A certain (partial) content of fossil carbon as a result of a chemical modification is not entirely ruled out, but at least a proportion of biogenic carbon must be present ("at least partly biogenic"). Entirely biogenic materials are especially preferred.

Where weights are given in percent (% by weight), these relate, if not otherwise stated, to the total mass of the reactants and additives of the synthetic resin adhesive composition according to the invention (that is to say to the constituents and/or their precursors present in the composition to be cured after mixing, without packaging, except in the case of capsules or films which can also act as fillers and make a contribution to the total mass of the hardening or hardened material, and without other possible parts such as static mixers, cartridge housings or the like).

Where mention is made of (meth)acrylates, this means acrylates, methacrylates or mixtures thereof.

A biogenic, non-reactive diluting agent (diluent) that is liquid as such at application temperature is especially to be understood as being one which occurs in liquid form as such (in unmixed form) at room temperature or in the range of from 0 to 30° C. It is especially a vegetable oil, such as castor oil, linseed oil, epoxidised linseed oil or corresponding hydroxylated and hydroxyalkylated oils (for example polyether polyester polyols or polyester polyols, such as corresponding Merginols® from Hobum Oleochemicals GmbH, Hamburg, Germany), soybean oil, epoxidised soybean oil or corresponding hydroxylated and hydroxyalkylated oils (for example polyether polyester polyols or polyester polyols, such as corresponding Merginols® from Hobum), rapeseed oil, or furthermore fatty acid alkyl esters ("biodiesel"), such as fatty acid methyl esters, for example rapeseed methyl ester or soybean oil methyl ester. Castor oil is especially preferred.

Alternatively a different biogenic polyol, especially biogenic glycerol, especially of vegetable origin, can be used.

Non-reactive means that, under customary application conditions, no chemical reaction or only a negligible chemical reaction takes place between the liquid diluting agent and the reactive system, that is to say the polymerising constituents and the constituents initiating the polymerisation (resin and hardener components, including reactive diluting agents, if present).

Expressly not included are isocyanate systems in which castor oil, glycerol and the like are used as chain-lengthening polyols. An addition of any hydroxyl groups to isocyanates is therefore not according to the invention.

The biogenic materials, especially castor oil, glycerol or a combination thereof, preferably castor oil, are added, for example, in a proportion of from 2 or 3 to 60% by weight, for example from >5 to 55% by weight. One example of suitable proportions is in the range from 5 to 20% by weight; another example is in the range from 21 to 30% by weight.

"Comprise" or "include" means that other components or features may be present in addition to the components or features mentioned and therefore does not refer to an exhaustive list, unlike "contain", the use of which does signify an exhaustive list of components or features.

Where the attribute "furthermore" is mentioned, this means that features without this attribute can be more preferred.

"And/or" means that the mentioned features/substances can in each case be present on their own or in a combination of two or more of the individually mentioned features/substances.

"A" usually denotes the indefinite article (except when it is recognisable as a number as immediately afterwards in this sentence) and especially means "at least one" (in the sense of 1, 2 or more).

As the synthetic resin there are used primarily reactive synthetic resins, especially reactive synthetic resins based on epoxy or free-radical-hardenable (=hardening after addition of a free-radical-former (hardener)) reactive synthetic resins (hardenable component), which in each case can be hardened by appropriate hardeners (hardener components), as described, for example, hereinbelow.

Synthetic Resins Based on Epoxy:

The reactive synthetic resins based on epoxy that can be utilised in use of and/or in multi-component synthetic resin adhesive compositions according to the invention comprise an epoxy component, preferably based on glycidyl compounds, for example those having an average glycidyl group functionality of 1.5 or more, especially of 2 or more, for example from 2 to 10, which can optionally comprise further glycidyl ether(s) as reactive diluent. The epoxides of the epoxy component are preferably poly(including di-)glycidyl ethers of at least one polyhydric alcohol or phenol, such as novolak, bisphenol F or bisphenol A, or mixtures of such epoxides, for example obtainable by reaction of the corresponding polyhydric alcohols with epichlorohydrin. Examples are trimethylolpropane triglycidyl ether, novolak epoxy resins, bisphenol A epichlorohydrin resins and/or bisphenol F epichlorohydrin resins, for example having an average molecular weight of ≤2000 Da. The epoxy resins can have, for example, an epoxy equivalent of from 120 to 2000, preferably from 150 to 400, such as especially from 155 to 195, for example from 165 to 185. The proportion in the total mass of the reactants and additives of the injectable synthetic mortar system is preferably from 5 to below 100% by weight, especially from 10 to 80% by weight, from 10 to 70% by weight or from 10 to 60% by weight. Also possible are mixtures of two or more of such epoxy components. Suitable epoxy resins, reactive diluents and hardeners are also to be found in the reference work by Lee H and Neville K, "Handbook of Epoxy Resins" (New York: McGraw-Hill), 1982 (these compounds are incorporated herein by reference).

"Based on epoxy" means especially that the synthetic resin adhesive compositions according to the invention can also comprise, in addition to the components mentioned hitherto, further customary ingredients (for example, additives or other constituents mentioned hereinabove or hereinbelow). These further ingredients can be present, for example, in an amount of, in total, up to 80% by weight, preferably between 0.01 and 65% by weight. Even when "based on" is not explicitly mentioned, such customary ingredients are also included.

Important examples of further ingredients are one or more selected from accelerators, reactive diluents, thixotropic agents, fillers, and further additives.

As accelerators there may be included, for example, tert-amines, such as imidazoles or tert-aminophenols, such as 2,4,6-trimethylaminomethylphenol, organophosphines or Lewis bases or Lewis acids, such as phosphoric acid esters, or mixtures of two or more thereof, in one or (especially in the case of multi-component systems) more of the components, preferably in each case in a hardener component, for example in a proportion by weight of from 0.001 to 15% by weight, based on the total mass of the reactants and additives of the injectable synthetic mortar system.

As thixotropic agents there can be used customary rheology aids, such as pyrogenic silica (optionally surface-treated to be made hydrophobic) or hydrogenated (solid at room temperature) or modified castor oils. They can be added, for example, in a proportion by weight of from 0.001 to 50% by weight, for example from 0.5 to 20% by weight.

The fillers can be present in one or more components, for example of a multi-component kit according to the invention, for example in one or both components of a corresponding two-component kit; the proportion of fillers is preferably from 0 to 90% by weight, for example from 10 to 90% by weight. Biogenic fillers, such as kernel flours or shell flours from fruits, can be used for this purpose. Additionally or alternatively, hydraulically hardenable fillers, such as gypsum, burnt lime or cement (for example, alumina cement or Portland cement), water glasses or active aluminium hydroxides, or two or more thereof, can be added.

Further ingredients can also be added, such as plasticisers, non-reactive diluting agents, flexibilisers, stabilisers, rheology aids, wetting and dispersing agents, colouring additives, such as dyes or especially pigments, for example for staining the components different colours for better monitoring of their intermixing, or the like, mixtures of two or more thereof. Such further additives can preferably be added in total in proportions by weight of in total from 0 to 90%, for example from 0 to 40% by weight.

Some of the compounds mentioned in the definition of epoxides, such as trimethylolpropane triglycidyl ether or hexanediol diglycidyl ether or glycidyloxypropyltrimethoxysilane, which have a lower viscosity than epoxides comprising aromatic groups, can also be used as reactive diluents, for example in a proportion by weight of from 0.1 to 90% by weight, for example between 0.5 and 75% by weight or between 1 and 40% by weight.

The hardener comprises at least one compound customary for epoxy hardening (reaction partner in polyaddition), the term "hardener" meaning preferably at least one compound which is customary for epoxy hardening with or without addition of fillers (especially biogenic fillers according to the invention) and/or further additives, such as water, thickeners and/or further additional substances, such as dyes and the like, in other words the complete hardener component. The hardener can be in the form of a separate component and/or also be incorporated (especially in protected form, that is to say, for example, in micro-encapsulated form) in the reactive resin formulation (in the form of a hardenable component, that is to say one which, after mixing with the hardener after breaking-open of the casing of the microcapsule, cures by means of polymerisation). Customary additives can be added, such as, for example, fillers (especially as defined hereinabove) and/or solvents (especially for producing a paste or emulsion), such as benzyl alcohol and/or water.

The compounds customary for epoxy hardening (which function as reaction partners in the course of polyaddition) are especially those having two or more groups selected from amino, imino and mercapto, for example corresponding amines (preferred), thiols or aminothiols, or mixtures of two or more thereof, for example as mentioned in Lee H and Neville K, "Handbook of Epoxy Resins" (New York: McGraw-Hill), 1982, which is incorporated herein by reference in this regard, for example di- or poly-amines mentioned therein, and/or di- or poly-thiols.

In special embodiments of the invention, the compounds customary for epoxy hardening, the epoxy base or both have no rubber modification.

The compounds customary (generally) for epoxy hardening include, for example in an embodiment of the invention di- or poly-amines such as especially aliphatic (such as ethylenediamine), cyclo-aliphatic and aromatic di- or poly-amines, amidoamines, amine adducts, polyether diamines or polyphenyl/polymethylenepolyamines, Mannich bases, polyamides and the like (special mention being made of Mannich bases, especially as disclosed in the publication WO 2005/090433, especially on page 3, final paragraph, to page 6, second paragraph, as in Example 1 or, especially, 2 thereof, which is incorporated herein by reference in this regard, on their own or in admixture with one or more further di- or poly-amines);
di- or poly-thiols such as especially di-functional or higher functional thiols, for example dimercapto-α,ω-C1-C12alkanes, 4,4'-dimercaptodicyclohexylmethane, di-mercaptodiphenylmethane or the like;
furthermore aliphatic aminols, such as especially hydroxy-lower alkyl-amines, such as ethanolamine, diethanolamine or 3-aminopropanol, or aromatic aminols, such as 2-, 3- or 4-aminophenol.

Mixtures of two or more of the mentioned compounds customary for epoxy hardening can also be used and/or included.

The compounds customary for epoxy hardening, where present, are present preferably in amounts of up to 95% by weight, preferably from 2 to 70% by weight, based on the total mass of reactants and additives in the mass of the synthetic resin adhesive composition to be cured (for example, the injectable synthetic resin system).

Based on the hardener component of a multi-component synthetic resin adhesive composition according to the invention, the proportion of the corresponding compounds in a possible preferred embodiment of the invention is from 1 to 95% by weight, for example 4 to 95% by weight, 5 to 90% by weight or 10 to 80% by weight.

Especially in the case of a hardener component of a multi-component system according to the invention, further additives can also be constituents of the "hardener", such as water, organic solvents, such as benzyl alcohol, fillers (for example as mentioned hereinabove) and further ingredients from the ingredients mentioned hereinabove, for example in a proportion by weight of, in total, from 0.01 to 70% by weight, for example from 1 to 40% by weight.

Free-Radical-Hardenable Reactive Synthetic Resins

The free-radical-hardenable reactive synthetic resins (preferred in embodiments of the invention) are primarily those based on free-radical-hardening unsaturated reactive resins and, present in a separate component, free-radical hardeners.

Preferably, no input of heat and/or (for example, UV) light from the outside is necessary for their use.

Free-radical-hardening unsaturated reactive resins are to be understood as being primarily those which comprise, as free-radical-curing (which includes "curable (for example prior to addition of hardener)") components, organic compounds having unsaturated (for example olefinic) radicals or, especially, which consist thereof, especially those which comprise 2 or more unsaturated (olefinic) radicals per molecule, primarily those which include hardenable esters with unsaturated carboxylic acid radicals; preferably in each case propoxylated or, especially, ethoxylated aromatic diol-, such as bisphenol-A-, bisphenol-F- or novolak-(especially di-) (meth)acrylate, epoxy(meth)acrylates, especially in the form especially of reaction products of di- or poly-epoxides, for example bisphenol-A-, bisphenol-F- or novolak-di- and/or -poly-glycidyl ethers, with unsaturated carboxylic acids, for example C2-C7alkenecarboxylic acids, such as especially (meth)acrylic acid, urethane- and/or urea-(meth)acrylates (which also includes oligomeric or polymeric variants), and/or unsaturated polyester resins, or the like; or two or more of such hardenable unsaturated organic components; the latter can have, for example, molecular weights of ≤2000 Da; for example they are present in a proportion by weight of from 0.1 to 90% by weight, for example between 0.5 and 75% by weight or between 1 and 40% by weight or from 40 to 65% by weight.

Examples of epoxy(meth)acrylates present in and/or used in special embodiments of the invention are those of formula

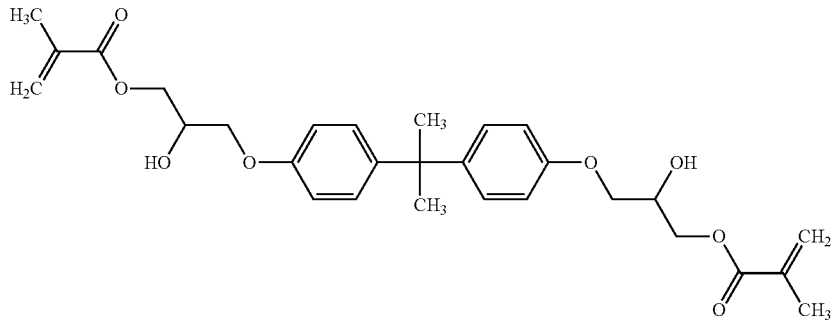 [SMILES: C=C(C)C(=O)OCC(O)COc1ccc(C(C)(C)c2ccc(OCC(O)COC(=O)C(=C)C)cc2)cc1]

or, more generally, taking into account the prelengthening reaction in the preparation of the bisphenol A diglycidyl ether of formula

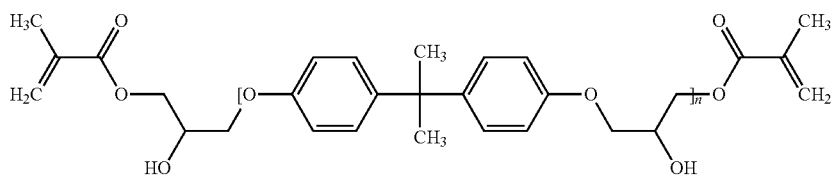

wherein n denotes a number greater than or equal to 1 (when mixtures of different molecules having different n values are present and are represented by the formula, non-integer numbers are also possible as a mean value). These too are subsumed hereinbelow under the term "vinyl esters".

Examples of propoxylated or, especially, ethoxylated aromatic diol-, such as bisphenol-A-, bisphenol-F- or novolak- (especially di-)(meth)acrylates present in and/or used in special embodiments of the invention are those of formula

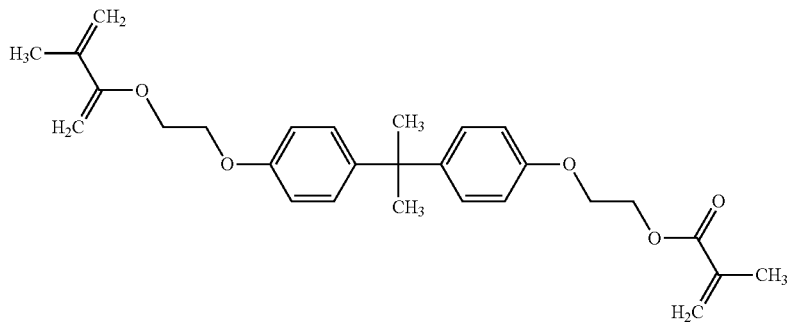 [SMILES: C=C(C)C(=C)OCCOc1ccc(C(C)(C)c2ccc(OCCOC(=O)C(=C)C)cc2)cc1]

or, generally, also taking into account higher degrees of ethoxylation:

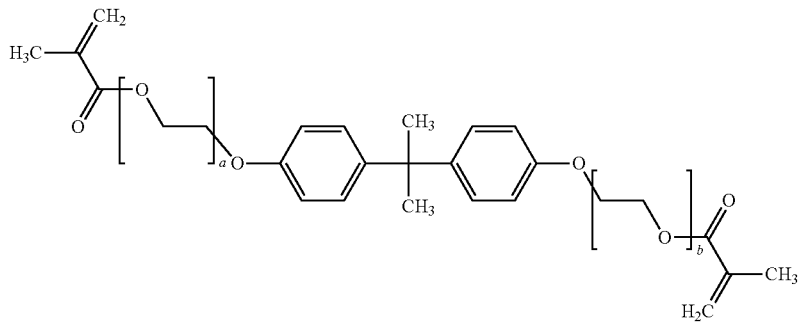

wherein a and b each independently of the other denote a number greater than or equal to 0, with the proviso that preferably at least one of the values is greater than 0, preferably both values being 1 or more (when mixtures of different molecules having different (a and b) values are present and are represented by the formula, non-integer numbers are also possible as a mean value, but for individual molecules seen in isolation only integers in each case). These too are subsumed hereinbelow under the term "vinyl esters".

Important examples of further ingredients here are aminic accelerators, inhibitors, reactive diluents, thixotropic agents, fillers and/or further additives.

As aminic accelerators there come into consideration those having sufficiently great activity, such as especially (preferably tertiary, especially hydroxyalkylamino-group-substituted) aromatic amines selected from the group selected from epoxyalkylated anilines, toluidines or xylidines, such as, for example, ethoxylated toluidine, aniline or xylidine, for example N,N-bis(hydroxypropyl or hydroxyethyl)-toluidines or -xylidines, such as N,N-bis(hydroxypropyl or hydroxyethyl)-p-toluidine, N,N-bis(hydroxyethyl)-xylidine and more especially corresponding higher alkoxylated technical products. One or more such accelerators are possible. The accelerators preferably have a content (concentration) of from 0.005 to 10%, especially from 0.1 to 5% by weight.

As inhibitors there can be added, for example, non-phenolic (anaerobic) and/or phenolic inhibitors.

As phenolic inhibitors (which are often provided as a component already mixed in with commercial free-radical-hardening reactive resins but which, furthermore, may also be absent) there come into consideration (non-alkylated or alkylated) hydroquinones, such as hydroquinone, mono-, di- or tri-methyl hydroquinone, (non-alkylated or alkylated) phenols, such as 4,4'-methylene-bis(2,6-di-tert-butylphenol), 1,3,5-trimethyl-2,4,6-tris(3,5-di-tert-butyl-4-hydroxybenzyl)-benzene, (non-alkylated or alkylated) pyro-catechols such as tert-butyl-pyrocatechol, 3,5-di-tert-butyl-1,2-benzenediol, or especially 4-methoxyphenol, or mixtures of two or more thereof. These have preferably a content of up to 1% by weight, especially between 0.0001 and 0.5% by weight, for example between 0.01 and 0.1% by weight.

As non-phenolic or anaerobic (that is to say, unlike the phenolic inhibitors, active also without oxygen) inhibitors (which especially have scarcely any effect on the curing times) there come into consideration preferably phenothiazine or organic nitroxyl free radicals. As organic nitroxyl free radicals there can be added, for example, those described in DE 199 56 509, which are incorporated herein by reference especially in respect of the compounds mentioned therein, especially 1-oxyl-2,2,6,6-tetramethyl-piperidin-4-ol ("4-OH-TEMPO" or "TEMPOL"). The proportion by weight of the non-phenolic inhibitors is preferably in the range of from 1 ppm (by weight) to 2% by weight, especially, for example, in the range of from 10 ppm to 1% by weight, based on the reactive resin formulation.

As thixotropic agents there can be used customary thixotropy-imparting rheology aids, such as pyrogenic silica and/or hydrogenated (solid at room temperature) or modified castor oils (for example as described at the outset). They can be added, for example, in a proportion by weight of from 0.01 to 50% by weight, for example from 0.1 to 5% by weight.

As fillers there can be used customary fillers, especially cements (for example Portland cements or alumina cements), chalks, sand, quartz sand, quartz powder or the like, which can be added in the form of powder, in granular form or in the form of shaped bodies, or other fillers, such as especially kernel flours or shell flours from plants, which further increases the biogenic carbon content, such as olive stone flour, or mixtures of two or more thereof, it being possible for the fillers furthermore or especially also to be silanised.

The fillers can be present in one or more components of a multi-component synthetic resin adhesive composition according to the invention, for example one or both components of a corresponding two-component kit; the content of fillers is preferably from 0 to 90% by weight, for example from 10 to 50% by weight (in the case of the installation of anchoring elements, broken casing material (for example splintered glass or splintered plastics), for example fragments of capsules, can also be counted as filler). In addition or as an alternative to one or more of the mentioned fillers, hydraulically hardenable fillers, such as gypsum, burnt lime or cement (for example alumina cement or Portland cement), water glasses or active aluminium hydroxides, or two or more thereof, can be added.

Further additives can also be added, such as plasticisers, non-reactive diluting agents, flexibilisers, stabilisers, rheology aids, wetting and dispersing agents, colouring additives, such as dyes or especially pigments, for example for staining the components different colours for better monitoring of their intermixing, or the like, or mixtures of two or more thereof. Such further additives can preferably be added in total in proportions by weight of in total from 0 to 90%, for example from 0 to 40% by weight.

As "reactive diluents", for example for preferred vinyl esters, it is possible, in addition, for one or more (relatively low-viscosity) free-radical-hardening unsaturated reactive diluents to be added, which are to be understood as being primarily those which comprise, as free-radical-curing (which includes "curable (for example prior to addition of hardener)") components, organic compounds having unsaturated (for example, olefinic) radicals or, especially, which consist of such compounds, for example especially (meth)acrylate or (meth)acrylamide monomers, such as acrylic acid and/or methacrylic acid or preferably esters thereof (referred to as (meth)acrylates) or amides, especially (meth)acrylates such as mono-, di-, tri- or poly-(meth)acrylates (including hydroxyalkyl (meth)acrylates, such as hydroxypropyl (meth)acrylate or hydroxyethyl (meth)acrylate, alkyl (meth)acrylates having 1 to 10 (meth)acrylate groups, such as mono-, di-, tri-, tetra-, penta-, hexa- or poly-(meth)acrylates, for example alkyl di- or tri-(meth)acrylates, such as 1,2-ethanediol di(meth)acrylate (ethylene glycol di(meth)acrylate), butanediol di(meth)acrylate, such as 1,3- or especially 1,4-butanediol di(meth)acrylate, hexanediol di(meth)acrylate, 1,10-decanediol di(meth)acrylate, diethylglycol di(meth)acrylate, trimethylolpropane tri(meth)acrylate, glycerol tri(meth)acrylate, polyglycerol poly(meth)acrylate, polyethylene glycol di(meth)acrylate, cycloalkyl (meth)acrylates, bicycloalkyl (meth)acrylates or heterocyclyl (meth)acrylates, wherein cycloalkyl or bicycloalkyl has from 5 to 7 ring carbon atoms and heterocyclyl has 5 or 6 ring atoms and 1 or 2 ring hetero atoms selected from N, O and S, such as tetrahydrofurfuryl (meth)acrylate or isobornyl (meth)acrylate, or acetacetoxyalkyl (meth)acrylate; or furthermore styrenes, such as styrene, α-methyl styrene, vinyl toluene, tert-butyl styrene and/or divinyl benzene; or mixtures of two or more thereof, to be provided as constituents that cure in parallel with the free-radical-hardening unsaturated reactive resin, for example in a proportion by weight of from 0.1 to 90% by weight, for example between 0.5 and 75% by weight or between 1 and 40% by weight.

The hardener includes at least one peroxide as actual initiator. The term "hardener" here preferably hereinabove and hereinbelow means pure initiators or stabilised initiators, with or without addition of filler, and/or further additives, such as water, thickeners and/or further additional substances, such as dyes, pigments, additives and the like, in other words the complete hardener component. For stabilisation, customary additives, such as gypsum, chalk, pyrogenic silica, phthalates, chlorinated paraffin or the like, can be added. In addition, fillers and/or (especially for the preparation of a paste or emulsion) solvents (non-reactive diluents, such as, for example, liquid hydroxyl-group-containing oils, for example castor oil), or water, thickeners, fillers (such as, for example, those mentioned above) and further additives of those mentioned above can also be added. The content of all additives can be, for example, a proportion by weight of in total from 0.1 (or 10) to 99.5% by weight, for example from 1 (or 10) to 99.1% by weight.

Based on the hardener component, the content of initiator (actual hardener) in a possible preferred embodiment of the invention is from 0.1 to 90% by weight, especially from 0.9 to 30% by weight.

As initiator for the hardening of the reactive resin formulations according to the invention there are used in the case of free-radical polymerisation, for example free-radical-forming peroxides, for example organic peroxides, such as diacyl peroxides, for example dibenzoyl peroxide, ketone peroxides, such as methyl ethyl ketone peroxide or cyclohexanone peroxide, or alkyl peresters, such as tert-butyl perbenzoate, inorganic peroxides, such as persulfates or perborates, and also mixtures thereof.

The proportion of hardener in a synthetic resin adhesive composition according to the invention, based on the mass (weight) of all reactants and additives without packaging, preferably lies in a range of from 1 to 60% by weight, for example from 2 to 50% by weight, it being possible for the proportion of peroxide, likewise based on the mass of the total associated reactive resin formulation (100%), to be 0.1 or more % by weight, in an especially preferred embodiment from 0.1 to <1% by weight, furthermore also from 1 to 10% by weight.

The free-radical-hardenable unsaturated reactive resin (and/or the totality of its components) is provided, for example, in a proportion by weight of from 5 to 99.5%, such as for instance from 10 to 98.5%, for example from 10 to 89.5%.

Here too, "based on" means that the synthetic resin adhesive compositions according to the invention can also include, in addition to the mentioned components, further customary ingredients (for example additives or other constituents as mentioned hereinabove or hereinbelow). Such further ingredients can be present together, for example in an amount of in total up to 80% by weight, preferably between 0.01 and 65% by weight. Even where "based on" is not expressly mentioned, such customary ingredients are included.

A hole or crevice is to be understood as being a hole or crevice that is present in a solid substrate (especially already completed as such), especially masonry or concrete, optionally also in a cracked substrate, such as cracked concrete, and is accessible from at least one side, for example a drilled hole, or furthermore a recessed region made during mortaring with inorganic mortar or plastering materials (such as cement or gypsum), or the like.

In a special embodiment of the invention, the hardenable components and the associated hardeners (hardener components) are stored separately from one another in a two-component or multi-component system before they are mixed with one another at the desired site (for example close to or in a hole or crevice, such as a drilled hole).

The injectable synthetic resin systems according to the invention are provided as multi-component systems (for example, a multi-component kit) and are also used as such.

A multi-component kit is understood to be especially a two-component or (furthermore) multi-component kit (preferably a two-component kit) having a component (A), which comprises either one or more free-radical-hardenable (=hardening after addition of a free-radical-former (hardener)) reactive synthetic resins or one or more reactive synthetic resins based on epoxy, as described hereinabove and hereinbelow, and the respective associated hardener (component (B)), as defined hereinabove and hereinbelow, it being possible for further additives to be provided in one or both of the components, preferably a two-chamber or furthermore multi-chamber apparatus, wherein the components (A) and (B) that are able to react with one another and optionally further separate components are present in such a way that their constituents cannot react with one another (especially not curing) during storage, preferably in such a way that their constituents do not come into contact with one another prior to use, but that enables components (A) and (B) and optionally further components to be mixed together for fixing at the desired location, for example directly in front of or in a hole, and, if necessary, introduced in such a way that the hardening reaction can take place therein. Also suitable are capsules, for example made of plastics, ceramics or especially glass, in which the components are arranged separated from one another by means of rupturable boundary walls (which can be ruptured, for example, when an anchoring element is driven into a hole or crevice, such as a drilled hole) or integrated separate rupturable containers, for example in the form of capsules, such as ampoules, arranged one inside the other; and also especially multi-component or especially two-component cartridges (which are likewise especially preferred), the chambers of which contain the plurality of components or preferably the two components (especially (A) and (B)) of the synthetic resin adhesive composition according to the invention having the compositions mentioned hereinabove and hereinbelow for storage prior to use, the kit in question preferably also including a static mixer.

The biogenic diluents used according to the invention can have been added to component (A), to component (B) or to both components.

Advantageously, the packaging materials (such as films, cartridges (also static mixers) or plastics capsules) can likewise be made from plastics having a high or completely biogenic carbon content, for example from corresponding polyamides or the like.

The use of a synthetic resin adhesive composition according to the invention at the desired site of use is effected by mixing the associated components (separated before mixing so as to inhibit a reaction), especially close to and/or directly in front of a hole or (for example especially when cartridges having static mixers are used) directly in front of and/or (especially when suitable capsules or ampoules are broken) inside a hole or crevice, for example a drilled hole.

"Embedding in mortar" is especially to be understood as meaning (material-bonded and/or interlocking) fixing of anchoring means made of metal (for example undercut anchors, threaded rods, screws, drill anchors, bolts) or, furthermore, made of some other material, such as plastics or wood, in solid substrates (preferably already completed as such), such as concrete or masonry, especially insofar as they are components of artificially erected structures, more especially masonry, ceilings, walls, floors, panels, pillars or the like (for example made of concrete, natural stone, masonry made of solid blocks or perforated blocks, furthermore plastics or wood), especially in holes, such as drilled holes. Those anchoring means can then be used to secure, for example, railings, covering elements, such as panels, façade elements or other structural elements.

Where "mixtures of two or more thereof" is mentioned, this includes especially mixtures of at least one of the mentioned constituents, which are emphasised as being preferred, with one or more other components, especially one or more components likewise identified as being preferred.

"Completed as such" means especially that the substrates are, except for possible surface modifications (such as coating, for example plastering or painting) or the like, already completed (for example, as building modules or walls) and are not completed only at the same time as the adhesive composition or are not made from the latter. In other words: the adhesive composition itself is not, then, already-completed substrate.

The introduction of the anchoring means is preferably effected only a short time, preferably 30 minutes or less, after the components of the fixing mortar according to the invention have been mixed together. In explanation: the mixing/introduction of the components at/into the desired locations at which anchoring means are to be fixed initiates a plurality of reactions which proceed substantially in parallel and/or with only a very small time interval between them. The final curing takes place in situ.

Specific embodiments of the invention also relate to the variants mentioned in the claims and abstract—the claims and the abstract are therefore incorporated herein by reference.

The Examples that follow serve to illustrate the invention, without limiting its scope, but also show embodiments of the invention (it also being possible for each individual specifically mentioned constituent to be used in any of the subject-matter of the invention mentioned hereinabove and hereinbelow instead of a general term, or a plurality or all thereof, which defines special embodiments of the invention).

Abbreviations:
EOBADMA: ethoxylated bisphenol A dimethacrylate
BDDMA: butanediol dimethacrylate
t-BBC: tert-butyl pyrocatechol

EXAMPLE 1: COMPOSITION I FOR A TWO-COMPONENT ADHESIVE COMPOSITION ACCORDING TO THE INVENTION

A two-component adhesive composition having a component (A) (hardenable resin=mortar component) and component (B) (hardener component) of the following composition is prepared:

(A) Mortar Component 1:

| Raw material | Amount used [%] |
| --- | --- |
| tetrahydrofurfuryl methacrylate Sarbio 6100 | 9.90 |
| ethoxylated bisphenol A dimethacrylate | 19.00 |
| inhibitor mixture (t-BBC, TEMPOL) | 0.05 |

-continued

| Raw material | Amount used [%] |
|---|---|
| aminic accelerator | 0.65 |
| pyrogenic surface-treated silica | 1.50 |
| quartz powder | 41.90 |
| olive stone flour | 27.00 |
| | 100.00 |

The mortar has a density of 1.58 g/ccm and a viscosity of 160 Pa*s at 23° C., measured with a Brookfield no. 7 spindle at 10 rpm. The bio-carbon content is 50.5%.
(B) Hardener Component 1:

| Raw material | Amount used [%] |
|---|---|
| castor oil | 40.00 |
| dibenzoyl peroxide 33% in inert filler | 16.00 |
| quartz sand | 41.50 |
| pyrogenic surface-treated silica | 2.00 |
| pigment | 0.50 |
| | 100.00 |

The hardener has a density of 1.50 g/ccm and a viscosity of 120 Pa*s at 23° C., measured with a Brookfield no. 7 spindle at 10 rpm. The bio-carbon content is 88.9% (and accordingly makes a substantial contribution to the total bio-carbon content of the adhesive composition (in total 56.5%)).

Components (A) and (B) are introduced separately in a ratio by volume of 5:1 into the chambers of a two-chamber cartridge made of biopolyamide.

EXAMPLE 2: COMPOSITION I FOR A TWO-COMPONENT ADHESIVE COMPOSITION ACCORDING TO THE INVENTION

A two-component adhesive composition having a component (A) (hardenable resin=mortar component) and component (B) (hardener component) of the following composition is prepared:
(A) Mortar Component 1: Identical to that in Example 1
(B) Hardener Component 2:

| Raw material | Amount used [%] |
|---|---|
| bioglycerol 86% (in water) | 35.00 |
| dibenzoyl peroxide 33% in inert filler | 40.00 |
| quartz sand | 23.50 |
| pyrogenic surface-treated silica | 1.00 |
| pigment | 0.50 |
| | 100.00 |

The hardener has a density of 1.68 g/ccm and a viscosity of 140 Pa*s at 23° C., measured with a Brookfield no. 7 spindle at 10 rpm. The bio-carbon content is 56.3%.

Components (A) and (B) are introduced separately in a ratio by volume of 5:1 into the chambers of a two-chamber cartridge made of biopolyamide

EXAMPLE 3: HIGH STORAGE STABILITY

EP 0 636 157 proposes epoxy compounds as stabilising agents. Higher stability can be achieved with castor oil, however, as shown in the following Table relating to the development (decomposition) of the peroxide content at 40° C. over time:

| | Starting peroxide content [%] | After 50 d at 40° C. [%] | Breakdown [%] |
|---|---|---|---|
| hardener component 1 | 5.28 | 4.9 | 7.2 |
| hardener component 2 | 13.2 | 13.0 | 1.5 |
| comparison hardener according to EP 0 636 157 B1 containing 40% epoxy resin, 8% dibenzoyl peroxide, 2% pyrogenic silica and chalk | 8 | 4.9 | 38.8 |

The adhesive compositions according to the invention accordingly have additional advantages: when the biogenic diluting agents are used in the hardener component, as also shown in the following Examples:
good stabilising action for the peroxide hardener;
formulation of very storage-stable pastes is possible.

EXAMPLE 4: BETTER WATER-MISCIBILITY

Synthetic resin adhesive compositions with materials according to the invention have only poor miscibility or are immiscible with water-based hardeners (that is to say hardeners prepared with water as paste-forming and stabilising agent). If the hardeners are formulated with the proposed biogenic raw materials, they can be incorporated more homogeneously and more satisfactorily into the (A) component, which can also be seen from the shorter gel time. It has also been found that in the case of many mortar components that contain bioflours, it is even possible to work with water-free hardeners alone.
Measurement of the Gel Time:

| | Mortar FIS V 360 S (' = min, " = sec) | Mortar component 1 |
|---|---|---|
| hardener component 1 | 11'33" | 6'20" |
| hardener FIS V 360 S (water-based) | 14'09" | not homogeneously miscible |

FIS V 360 S is a branded product of fischerwerke GmbH & Co. KG, Waldachtal, Germany.

It follows from the above that the hardener and mortar components according to Example 1 exhibit better miscibility and a shorter gel time than a known high-quality standard resin based on methacryloylated ethoxylated bisphenol A.

The invention claimed is:
1. A method of embedding an anchoring means in holes or crevices, the method comprising:
introducing a multi-component synthetic resin adhesive composition and an anchoring means into a hole or crevice, the multi-component synthetic resin adhesive composition comprising at least one non-reactive diluent comprising at least one biogenic, non-reactive diluent that is liquid at application temperature; and causing the synthetic resin adhesive composition to cure;

wherein the term biogenic means that the reactive diluent comprises bio-based carbon obtained from plants or vegetable materials or from animal sources, which is detected by means of the $^{14}C$ method in accordance with ASTM 6866 2008, Method A, and wherein the at least one biogenic, non-reactive diluent comprises at least one of castor oil, linseed oil, soybean oil, epoxidized soybean oil, hydroxylated soybean oil, hydroxy alkylated soybean oil or rapeseed oil, or fatty acid alkyl esters.

2. A method according to claim 1, wherein the at least one biogenic, non-reactive diluent comprises castor oil.

3. The method according to claim 1, wherein the biogenic non-reactive diluent is, in total, provided in a proportion of from 5% to 20% by weight or from 21% to 30% by weight.

4. The method of claim 1, wherein the synthetic resin adhesive composition comprises a reactive resin component (A) comprising a reactive synthetic resin based on epoxy or a free-radical-hardenable reactive synthetic resin, and a hardener component (B).

5. The method according to claim 4, wherein the biogenic, non-reactive diluent is in the hardener component (B).

6. The method of claim 4, wherein the reactive synthetic resin component (A) comprises a free-radical-hardenable reactive synthetic resin and hardener component (B) comprises a peroxide as initiator.

7. The method of claim 4, wherein the reactive synthetic resin component (A) comprises at least one epoxy(meth)acrylate having the formula

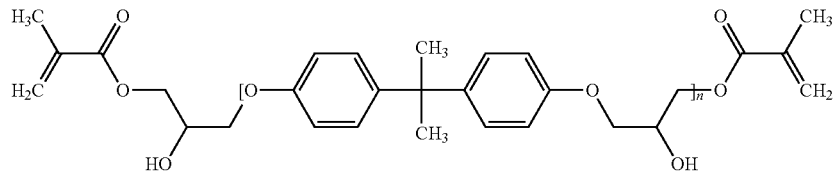

wherein n denotes a number greater than or equal to 1, and/or at least one ethoxylated aromatic diol-(meth)acrylate having the formula

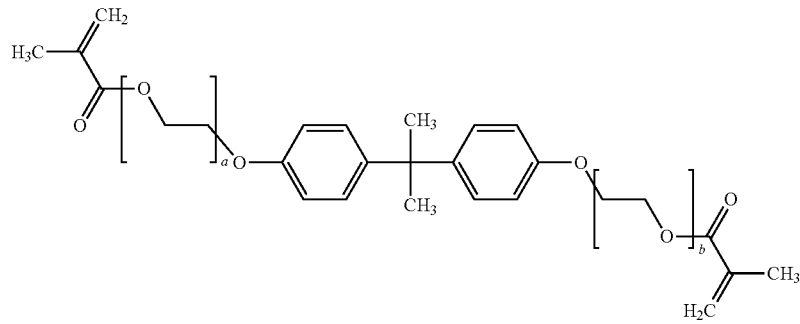

wherein a and b each, independently of the other, denote a number greater than or equal to 0, with the proviso that at least one of the values is greater than 0, or both values are 1 or more, or a propoxylated analogue thereof, and/or one of more urethane (meth)acrylates.

8. The method of claim 1, wherein the multi-component synthetic adhesive composition further comprises at least one additive selected from aminic accelerators, inhibitors, reactive diluents, thixotropic agents, plasticisers, flexibilizers, stabilisers, rheology aids, wetting and dispersing agents, and colouring additives.

9. The method of claim 1, wherein the synthetic adhesive composition comprises:
a) a hardenable reactive resin;
b) a hardenable reactive diluent having a viscosity <800 mPa*s, measurable using a Brookfield viscosimeter at 23° C. with a no. 3 spindle at 20 rpm,
c) a hardener, by means of which a.) and b.) are hardened and/or by means of which the hardening thereof is initiated; and
d) the biogenic non-reactive diluent.

10. The method of claim 1, wherein the synthetic adhesive composition comprises
a) a reactive resin having 2 or more unsaturated groups;
b) a reactive diluent having unsaturated groups and having a viscosity of <800 mPa*s; measurable using a Brookfield viscosimeter at 23° C. with a no. 3 spindle at 20 rpm:
c) an aminic accelerator;
d) an inhibitor;
e) a free radical initiator; and
f) at least 3% of the biogenic non-reactive diluent.

11. The method of claim 1, wherein the synthetic adhesive composition comprises the biogenic non-reactive diluent and a reactive synthetic resin component (A) comprising at least one biogenic filler, an epoxy(meth)acrylate and/or a propoxylated or ethoxylated aromatic diol-di(meth)acrylate, and/or urethane (meth)acrylate, at least one reactive diluent in the form of an olefinic compound selected from mono-, di-, tri- or poly-(meth)acrylates, hydroxyalkyl (meth)acrylates, or two or more thereof, a phenolic and/or non-phenolic inhibitor, an aminic accelerator, a thixotropic agent and a further filler, and a hardener component (B) comprising a free-radical-forming peroxide, a filler, a thixotropic agent and optionally a pigment.

12. A method of embedding an anchoring means in holes or crevices, the method comprising introducing a multi-component synthetic resin adhesive composition and an anchoring means into a hole or crevice, the multi-component synthetic resin adhesive composition comprising at least one non-reactive diluent comprising at least one biogenic, non-reactive diluent that is liquid at application temperature; and causing the synthetic resin adhesive composition to cure;

wherein the term biogenic means that the reactive diluent comprises bio-based carbon obtained from plants or vegetable materials or from animal sources, which is detected by means of the $^{14}C$ method in accordance with ASTM 6866 2008, Method A, and wherein the synthetic resin adhesive composition is provided as a two-component kit, having a reactive synthetic resin component (A) and a hardener component (B), wherein the biogenic, non-reactive diluent is in the synthetic resin component (A).

13. The method according to claim 12, wherein the at least one biogenic, non-reactive diluent comprises at least one of castor oil, linseed oil, soybean oil, epoxidized soybean oil, hydroxylated soybean oil, hydroxy alkylated soybean oil or rapeseed oil, or fatty acid alkyl esters.

14. A method according to claim 12, wherein the at least one biogenic, non-reactive diluent comprises castor oil.

15. The method according to claim 12, wherein the biogenic non-reactive diluent is, in total, provided in a proportion of from 5% to 20% by weight or from 21% to 30% by weight.

16. The method of claim 12, wherein the synthetic resin adhesive composition comprises a reactive resin component (A) comprising a reactive synthetic resin based on epoxy or a free-radical-hardenable reactive synthetic resin, and a hardener component (B).

17. The method of claim 16, wherein the reactive synthetic resin component (A) comprises a free-radical-hardenable reactive synthetic resin and hardener component (B) comprises a peroxide as initiator.

18. The method of claim 16, wherein the reactive synthetic resin component (A) comprises at least one epoxy (meth)acrylate having the formula

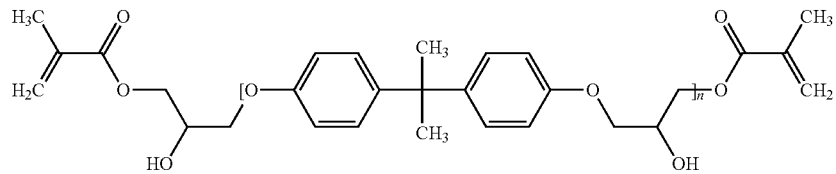

wherein n denotes a number greater than or equal to 1, and/or at least one ethoxylated aromatic diol-(meth)acrylate having the formula

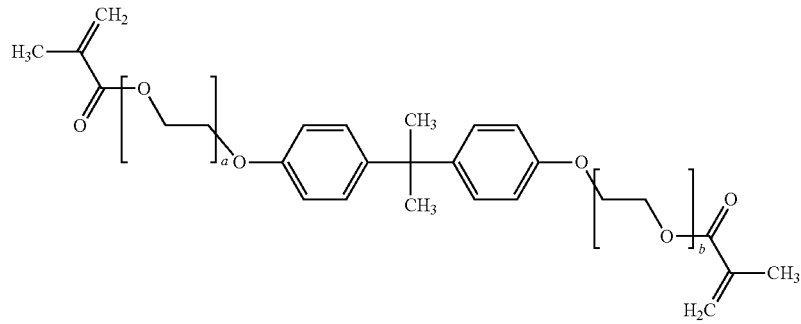

wherein a and b each, independently of the other, denote a number greater than or equal to 0, with the proviso that at least one of the values is greater than 0, or both values are 1 or more, or a propoxylated analogue thereof, and/or one of more urethane (meth)acrylates.

19. The method of claim 12, wherein the multi-component synthetic adhesive composition further comprises at least one additive selected from aminic accelerators, inhibitors, reactive diluents, thixotropic agents, plasticisers, flexibilizers, stabilisers, rheology aids, wetting and dispersing agents, and colouring additives.

20. The method of claim 12, wherein the synthetic adhesive composition comprises:
   a) a hardenable reactive resin;
   b) a hardenable reactive diluent having a viscosity <800 mPa*s, measurable using a Brookfield viscosimeter at 23° C. with a no. 3 spindle at 20 rpm,
   c) a hardener, by means of which a.) and b.) are hardened and/or by means of which the hardening thereof is initiated; and
   d) the biogenic non-reactive diluent.

* * * * *